United States Patent [19]

Iida et al.

[11] Patent Number: 5,059,887
[45] Date of Patent: Oct. 22, 1991

[54] STEP-UP AND STEP-DOWN CHOPPER DEVICE

[75] Inventors: Katsuji Iida; Takahiro Kishimoto, both of Ebina, Japan

[73] Assignee: Toyo Denki Seizo Kabushiki Kaisha, Japan

[21] Appl. No.: 566,085

[22] Filed: Aug. 10, 1990

[30] Foreign Application Priority Data

Aug. 23, 1989 [JP] Japan .................. 1-216857

[51] Int. Cl.$^5$ ............................. G05F 1/56
[52] U.S. Cl. .......................... 323/222; 363/124
[58] Field of Search ........... 363/65, 124; 323/222, 323/224

[56] References Cited

U.S. PATENT DOCUMENTS 4,622,511 11/1986 Moore .................... 363/21

FOREIGN PATENT DOCUMENTS 0068877 5/1980 Japan .................. 323/222
0076170 5/1984 Japan .................. 323/222
1073860 2/1984 U.S.S.R. ............... 323/267

Primary Examiner—Steven L. Stephan
Assistant Examiner—Adolf Berhane
Attorney, Agent, or Firm—Silverman, Cass & Singer, Ltd.

[57] ABSTRACT

A direct current to direct current converting chopper device comprising essentially two switching elements, two reactors, two diodes and three condensers likewise with a conventional device but able to maintain rather stable output voltages to avoid higher harmonic noises and able to provide output voltage higher than the input voltage.

2 Claims, 3 Drawing Sheets

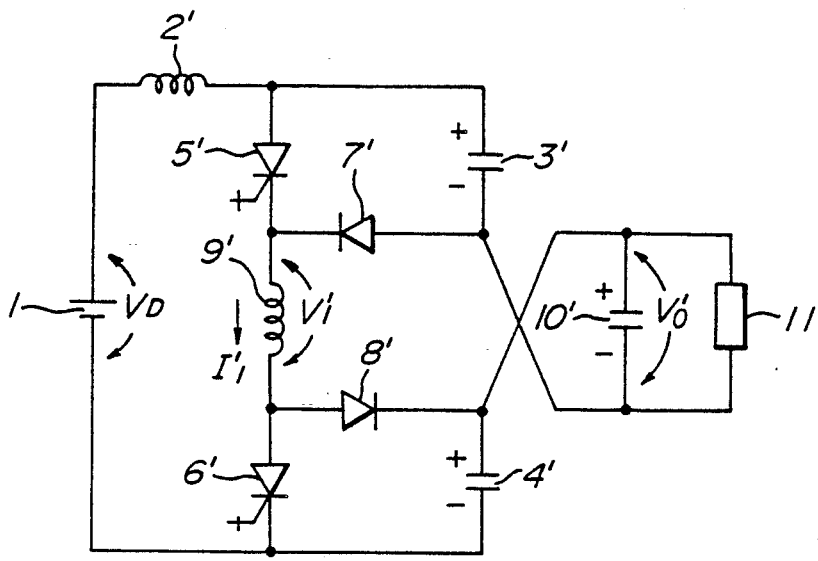
FIG_1
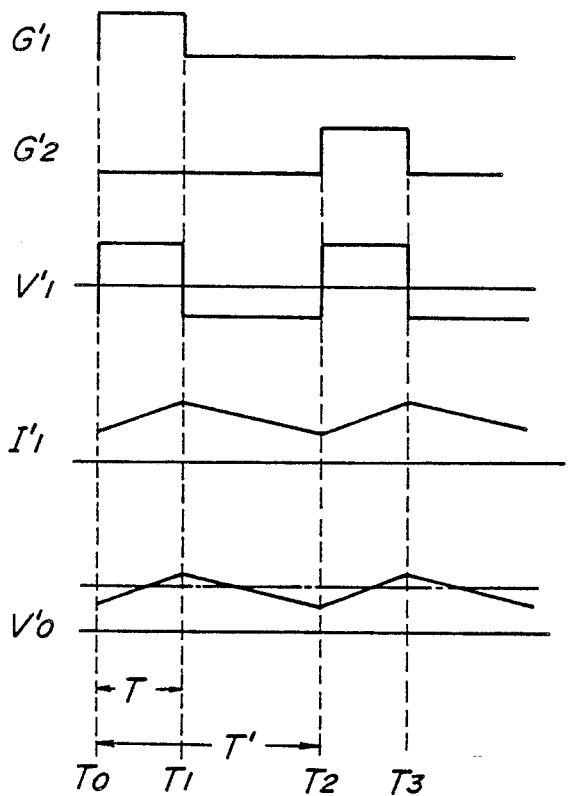
FIG_2a
(V_D > V_b)
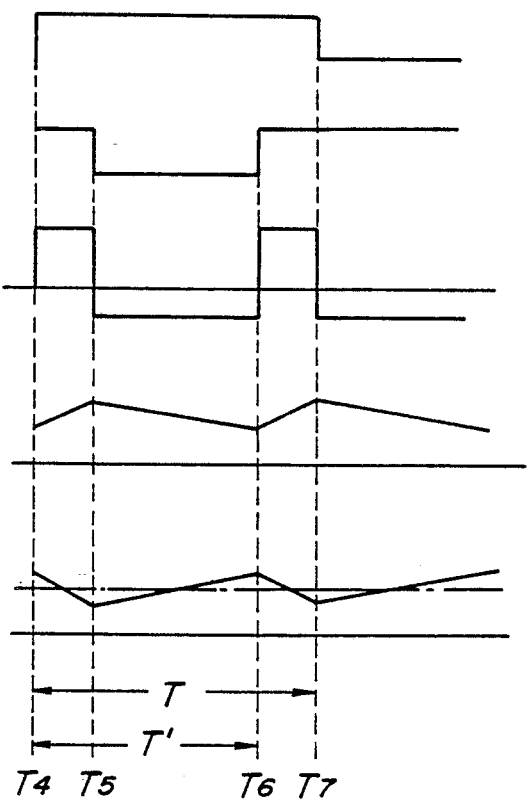
FIG_2b
(V_D < V_b)

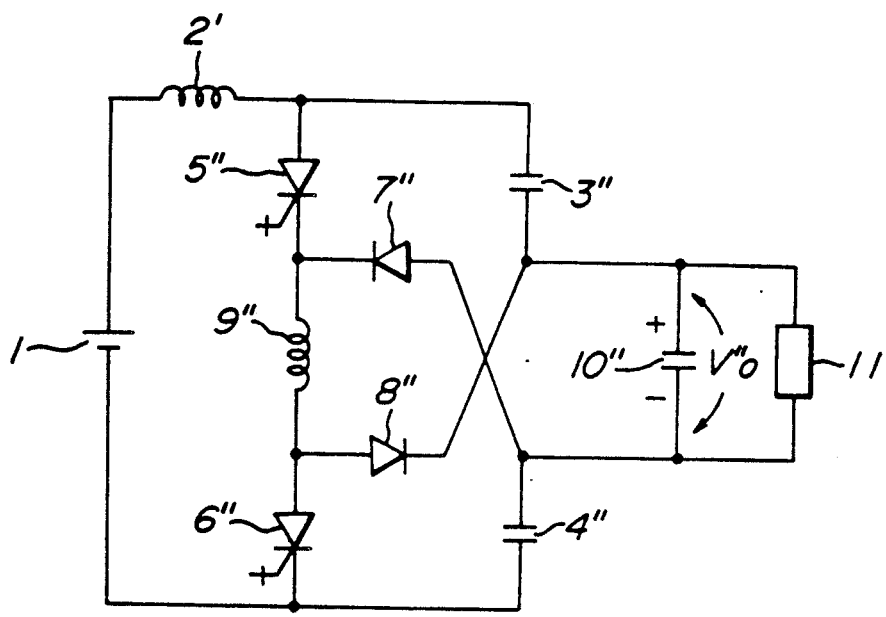
FIG_3
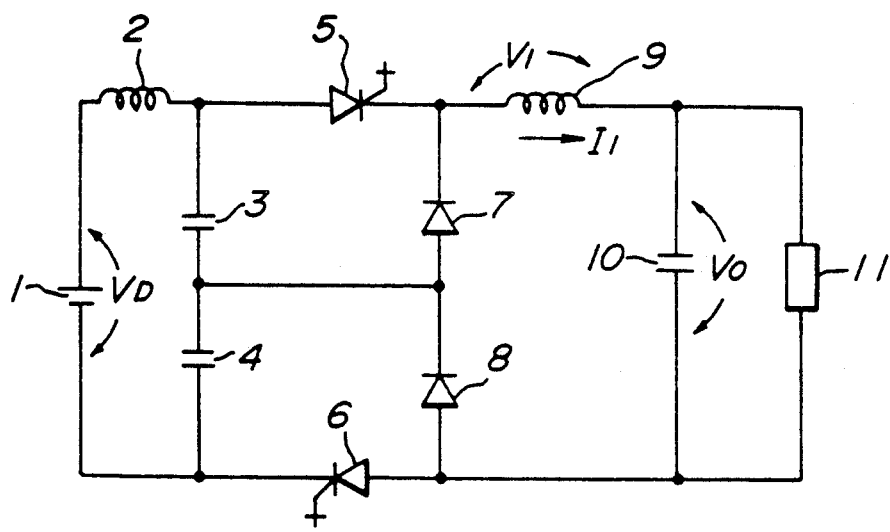
FIG_4
PRIOR ART

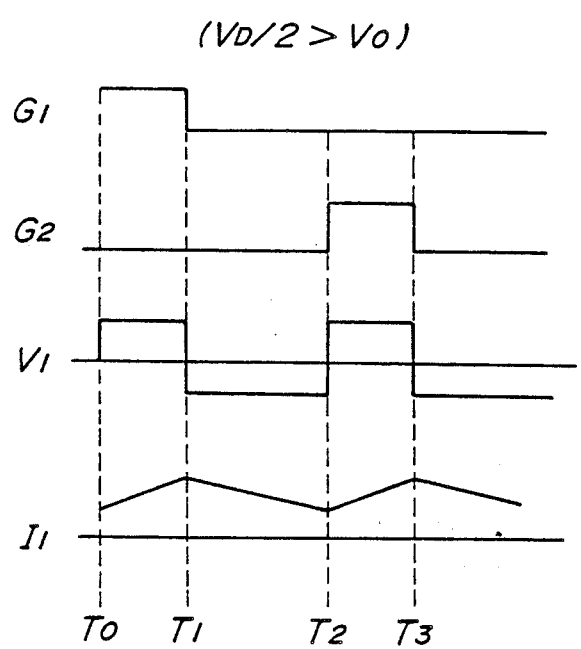
FIG_5a
($V_D/2 > V_O$)
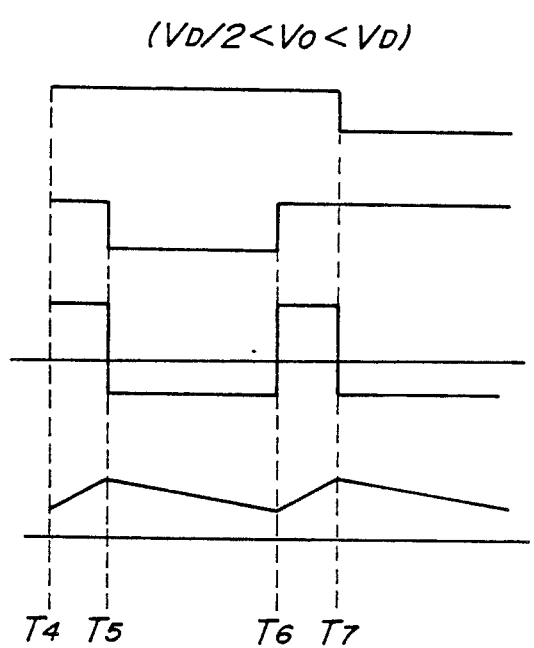
FIG_5b
($V_D/2 < V_O < V_D$)

STEP-UP AND STEP-DOWN CHOPPER DEVICE

BACKGROUND OF THE INVENTION

1. Field of the Invention

The present invention relates to a direct current to direct current converter used for instance in an auxiliary direct current source in an electric train.

2. Related Art Statement

It has been known a double step-down chopper device as shown in FIG. 4, when a chopper device is used for an auxiliary direct current source of for example, in an electric train.

In FIG. 4, reference numeral 1 shows a direct current source, 2 and 9 reactors, 3, 4 and 10 condensers, 5 and 6 switching elements, 7 and 8 diodes and 11 shows the load.

Such a circuit arrangement acts to divide the voltage of the direct current source 1 into two substantially equal voltages by the condensers 3 and 4 and by alternately switch on and off the two switching elements 5 and 6 generally at 180° phase shift, a direct current to direct current converter is realized by means of the switching elements having relatively lower withstand voltages compared with the voltage of the direct current source 1 and by means of reactors having smaller capacities compared with the switching period of the switching elements. Although a very detailed explanation is omitted since the device has been conventionally used and well known in the art, but the function thereof will be explained by referring to FIG. 5.

FIG. 5 shows waveforms of various portions of the circuit shown in FIG. 4. Namely, $G_1$ and $G_2$ show gate signals of the switching elements 5 and 6, respectively. $V_1$ and $I_1$ are the voltage and current, respectively, across the reactor 9. $V_0$ is the voltage of condenser 10 consisting the direct current output voltage. FIG. 5a shows a case in that the voltage $V_0$ of the condenser 10 is lower than the voltage of condensers 3 and 4 and FIG. 5b shows a case in which the voltage $V_0$ is higher than the voltage of the condensers 3 and 4 and is lower than the voltage $V_D$ of the direct current source 1.

At first referring to FIG. 5a, if the switching element 5 turns-on at a time $T_0$, a closed circuit is formed in the following chain.

condenser 3 ⟶ switching element 5 ⟶ reactor 9 ⟶ condenser 10 (load 11) ⟶ diode 8 ⟶ condenser 3

If we assume the voltage of the condenser 3 as;

$V_{D1}[\div(V_D/2)]$, a difference of voltages between this voltage $V_{D1}$ and the voltage $V_0$ across the condenser 10 is applied across the reactor 9. Accordingly, an increasing current having gradient of increase determined by the reactance L, i.e.

$$\frac{di}{dt} = \frac{(V_D/2) - V_0}{L} \qquad (1)$$

flows through the reactor 9 and the reactor 9 stores the power while supplying the power to the load 11.

In this case, the power is supplied from the direct current source 1 forming an input of the device through the following route.

direct current 1 ⟶ reactor 2 ⟶ condenser 3 ⟶

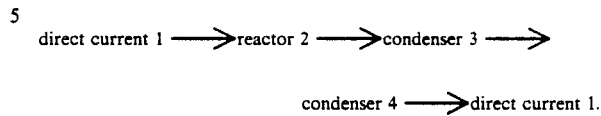

This condition continues until a time $T_1$.

If the switching element 5 turns-off at the time $T_1$, a closed loop circuit is formed in the following route.

reactor 9 ⟶ condenser 10 (load 11) ⟶ diode 8 ⟶

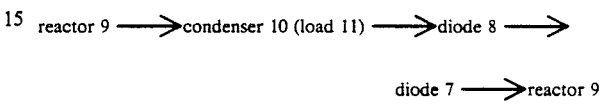

So that the reactor 9 produces a voltage having the same value with that of the condenser 10 and having the opposite polarity with that during the term ($T_0$–$T_1$) and a decreasing current decided according to the following equation;

$$\frac{di}{dt} = \frac{V_0}{L} \qquad (2)$$

flows through the reactor 9 and it discharges the power stored in it to the load 11. In this case the power is supplied from the direct current source 1 likewisely the previous term of ($T_0$–$T_1$).

During the succeeding term after this time $T_2$, a same operation is repeated by the switching element 6 and the condenser 4.

Among the whole period of term, during the terms ($T_0$–$T_1$) and ($T_2$–$T_3$), the power is supplied from the direct current source 1 to the condenser 10, i.e. load 11, the voltage $V_0$ tends to increase depending on the value of the condenser 10 and the load 11. Whereas, during the terms ($T_1$–$T_2$) and ($T_3$–$T_0$), since the reactor 9 and the condenser 10 supply the power to the load 11, the voltage $V_0$ tends to decrease. Therefore, the voltage $V_0$ is controlled at a mean value between the maximum increased voltage and the minimum decreased voltage throughout the overall period.

Then referring to a case shown in FIG. 5b, if the switching element 6 turns-on at a time $T_4$, as the switching element 5 had already been turned-on in this mode, following closed circuit is formed.

condenser 3 ⟶ switching element 5 ⟶ reactor 9 ⟶ condenser 10 (load 11) ⟶ switching element 6 ⟶

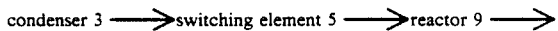

If we assume the voltage across the condenser 4 as $V_{D2}[\div(V_D/2)]$, an increasing current having its gradient decided by the sum of voltages $V_{D1}$ and $V_{D2}$ and deducted by the voltage $V_0$ and divided by the value of the inductance L, i.e.

$$\frac{di}{dt} = \frac{V_D - V_0}{L} \qquad (3)$$

will flow through the reactor 9, so that a power is stored in the reactor 9 while supplying the power to the load.

When the switching element 6 turns-off at a time $T_5$, following closed circuit is formed.

condenser 3 ⟶ switching element 5 ⟶ reactor 9 ⟶ condenser 10 (load 11) ⟶ diode 8 ⟶ condenser 3

Thus a decreasing current having gradient decided by the difference of voltage $V_0$ and $V_{D1}[\div(V_D/2)]$ and the value of the inductance L will flow through the reactor 9 so that the rector 9 discharges the power stored in it. After the time $T_6$, a same operation will be repeated by the condenser 4 and the switching element 6.

The operation mode of supplying the power from the direct current source 1 and the controlling of the voltage $V_0$ is the same as the case of FIG. 5a.

This system has the following advantages.

(1) Element having relatively low breakdown voltage compared with the voltage of the direct current source 1 can be used for the respective switching elements since only a fractional voltage of the voltage of the direct current source 1 by the condensers 3 and 4 is applied to the switching elements.

(2) The reactor 9 can be made of smaller capacity since the two switching elements turn-on and turn-off alternately (in general at 180° phase difference) and the frequency of the voltage across the reactor 9 becomes twice with that of the operating frequency of the switching elements.

However, this known system also has the following disadvantages.

(3) Voltage of the condenser 10 i.e. value of the output voltage can not be made higher than the voltage of the direct current source 1.

(4) The load potential varies very suddenly with respect to the negative polarity of the direct current source 1 usually at the ground potential by the voltage of the condenser 3 in accordance with on-off operation of the switching element 6 so that a current flows through a leakage capacitance of the load circuit against the ground potential and this causes unwanted noise.

When a chopper device is used as an auxiliary direct current source of an electric vehicle, the variation range of the input voltage is rather wide in general for instance between DC 900-1800 V so that device may be of a large size by an increase of the required current value to meet a large capacity load in a device having output voltages unable to be higher than the input voltages like the conventional double step-down choppers.

Furthermore, although it is necessary to cut flow of higher harmonics through the capacitance against the ground by decreasing the potential variation against the ground as far as possible in order to avoid troubles by an induced noise against signalling equipments, a problem was involved in the conventional double step-down chopper devices, since a sharp and large potential variation was inavoidable by the on-off operation of the switching elements.

SUMMARY OF THE INVENTION

The present invention is to improve the abovementioned disadvantages of the conventional devices and has its object to realize, a device of this kind being able to set the value of the output voltage freely higher or lower compared with the value of the input voltage and also the potential of the load circuit against the ground potential of the source voltage does not change stepwisely and also the device can be formed by a simple circuit arrangement in the same degree of the conventional devices.

The circuit arrangement of the present invention is formed by connecting a first series circuit of three condensers in parallel to the input direct current voltage and also a second series circuit having a rector inserted between two switching elements is connected in parallel thereto and by connecting the both ends of the intermediate condenser with the both ends of the reactor through two diodes respectively and from the both ends of the intermediate condenser the load current is derived.

The present invention having the abovementioned circuit realize a device of this kind able to step-up and step-down the source voltage and thus satisfying the aforementioned object of the invention.

The invention will be explained by referring to accompanying drawings.

BRIEF DESCRIPTION OF THE DRAWINGS

FIG. 1 is a circuit diagram of an embodiment of the present invention;

FIG. 2 is a waveform diagram for showing waveforms of various parts of the circuit shown in FIG. 1;

FIG. 3 is a circuit diagram of a modified embodiment of the device of the present invention;

FIG. 4 shows a circuit diagram of a conventional double step-down chopper device as has been explained already; and FIG. 5 is a waveform diagram for showing waveforms of various parts of the circuit of FIG. 4.

DETAILED DESCRIPTION OF THE PREFERRED EMBODIMENTS

FIGS. 1 and 2 show an essential construction and wave forms of various points of one embodiment of the present invention expressed likewisely with FIGS. 4 and 5. In these drawings, 2' and 9' are reactors, 3', 4' and 10' condensers, 5', 6' switching elements, 7', 8' diodes. Further $G_1'$ and $G_2'$ represent gate signals of the switching elements 5' and 6', $V_1'$ and $I_1'$ are voltage and current of the rector 9', $V_0'$ is the voltage of the condenser 10'. In these drawings, the same parts with that in FIGS. 4 and 5 are shown by the same reference numerals.

Namely, in the circuit construction shown in FIG. 1, a series circuit of a switching element 5', a reactor 9' and a switching element 6' is connected to a direct current source 1 in parallel with a series circuit of condensers 3', 10' and 4'. The both ends of the condenser 10' and that of the reactor 9' are coupled together via diodes 7' and 8', respectively, as shown in the drawing and the two end terminals of the condenser 10' are connected to a load 11.

In the abovementioned construction, the condensers 3', 4 and 10' are of large capacities and substantially not changing the voltage during one cycle of usual chopper operation.

Function of the device having aforementioned construction is as follows. At first the explanation will be given for a case as shown in FIG. 2a, in which the voltage $V_D$ of the direct current source 1 is higher than the output voltage ($V_0'$) of the condenser 10'. In this case, the voltage across the condensers 3' and 4' is expressed by;

$$[(V_D \div V_0')/2],$$

When we assume that the switching element 5' is turned-on at a time $T_0$, a following closed circuit is formed;

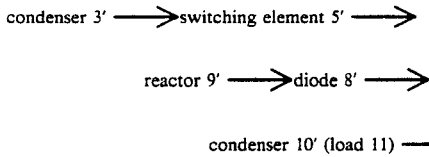

Thus, an increasing current will flow through the reactor 9' having its gradient decided by the voltage of condensers 3' and 10' and the reactance of the reactor 9', i.e.

$$\frac{di}{dt} = \frac{V_D - V_0'}{2L} \tag{5}$$

In this case energy is stored in the reactor 9' while supplying a power to the load.

This time, a power is supplied from the direct current source 1 constituting an input of the circuit, through the following route;

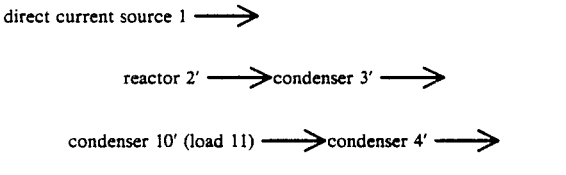

If the switching element 5' turns-off at a time $T_1$, a closed circuit consisting of;

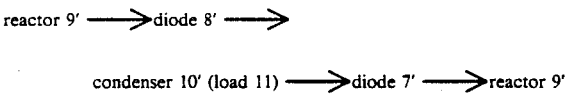

is formed and a voltage equal to the source voltage $V_0'$ is induced across the reactor 9' with its positive polarity at the side of connecting point with the diode 8' so that a current decreasing at a rate of $$[(di/dt) = (V_0'/L)]$$

will flow through the reactor 9' and the energy stored in the reactor 9' is discharged. In this case, the power is supplied from the direct current source 1 likewise the previous term of $(T_0-T_1)$.

During the term of $(T_0-T_1)$, the condenser 10' and the load 11 are supplied with power from the condenser 3'. Accordingly, depending upon the capacitance value of the condenser 10' and the amount of the load 11, the terminal voltage $V_0'$ of the condenser 10', i.e. the output voltage tends to increase. On the other hand, during the term $(T_1-T_2)$, the reactor 9' will supply the power to the condenser 10' and to the load 11, the said voltage $V_0'$ tends to decrease. Namely, during the time $T_0 \rightarrow$ time $T_1 \rightarrow$ time $T_2$, the voltage $V_0'$ is controlled at an average voltage between its increased maximum voltage and decreased minimum voltage. After the time $T_2$, a same operation is repeated by the switching element 6' and by the condenser 4'.

The abovementioned mode of operation is same as the conventional chopper devices.

Then a case that the voltage $V_D$ of the direct current source 1 is lower than the voltage $V_0'$ of the condenser 10' (output voltage) will be explained by referring to FIG. 2b.

At a time $T_4$, the switching element 5' turns-on and at this time as the switching element 6' had already been turned-on, a closed circuit is formed in the following route.

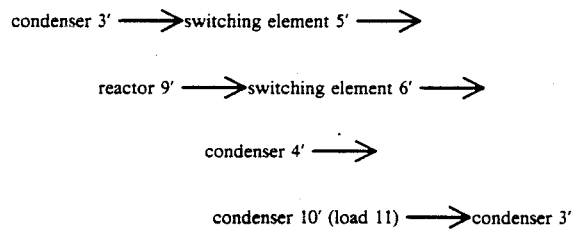

Thus an increasing current according to $[(di/dt) = (VD/L)]$ will flow through the rector 9' so that a power is accumulated in the reactor 9' while supplying the power to the load 11. This operation is effected without any relation to the voltage of the condenser 10' i.e. with the output voltage.

In this case, the power is supplied through the following route.

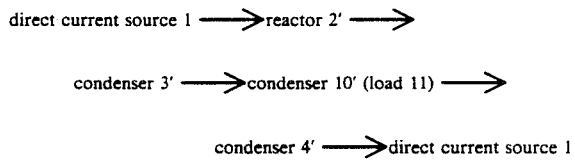

If the switching element 6' turns-off at a Time $T_5$, a closed circuit is formed in the following route.

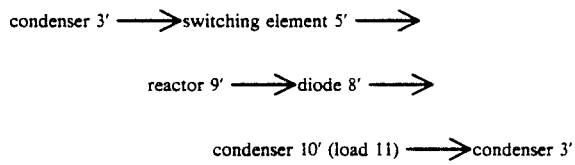

So that decreasing current according to:

$$\frac{di}{dt} = \frac{V_0' - V_D}{2L} \tag{6}$$

will flow through the reactor 9' and while supplying the power to the load, a power accumulated in the reactor 9' will be discharged. In this case a power is supplied from the direct current source 1 likewisely with the term $(T_4-T_5)$.

During the term $(T_4-T_5)$ and term $(T_5-T_6)$, the voltage $V_0'$ is controlled between the increased maximum voltage and decreased minimum voltage just same as the case indicated in FIG. 2a. After the time $T_6$, a same operation is repeated by the switching element 6' and the condenser 4'.

Assuming the on-period of the switching element 5', namely the period ($T_0 \rightarrow T_1$) and T and the period ($T_0 \rightarrow T_2$) as T' which usually is a constant value, the relation between the voltage $V_D$ of the direct current source 1 and the output voltage $V_0'$ is expressed by:

$$\frac{V_D - V_0'}{2} \times T = V_0'(T' - T) \quad (7)$$

By controlling T to satisfy the following relationship, $$T = \frac{2}{1 + (V_D/V_0')} \times T' \quad (8)$$

a desired output voltage can be obtained.

In the same manner, for the case shown in FIG. 2b, by assuming the on-period of the switching element 5' namely the period ($T_4 \rightarrow T_7$) as T and the period ($T_4 \rightarrow T_6$) as T', the relation between the voltage $V_D$ and the voltage $V_0'$ is expressed as follows.

$$\frac{V_0' - V_D}{2}(2T' - T) = V_D(T - T') \quad (9)$$

Namely, it establishes;

$$T = \frac{2}{1 + (V_D/V_0')} \times T' \quad (10)$$

By controlling the term T, a desired output voltage $V_0'$ can be obtained.

As explained above, by the operation of circuit as shown in FIG. 1, the potential of the condenser 10' (load 11) at the side of its terminal with the diode 8' against the negative polarity of the direct current source 1 is the same as the terminal voltage of the condenser 4'. Namely it has value of $$[(V_D + V_0')/2]$$

and not causing sudden stepwise variation.

FIG. 3 shows an essential portion of an alternative embodiment of the present invention. In which, 3", 4", 10" are condensers, 5", 6" are switching elements, 7", 8" diodes, and 9" is the reactor. In this figure, the same reference numerals with that shown in FIG. 1 and FIG. 4 show the same constructive elements.

Namely, the operation of the circuit of this modified embodiment is substantially the same with that of the previously explained embodiment. But in this modified embodiment, the polarity of the terminal voltage of the condenser 10" is opposite to that shown in FIGS. 1 and 2. Also the voltages across the condensers 3" and 4" are expressed by:

$$[(V_D - V_0'')/2]$$

so that it is only different in that the polarity is reversed during the term of ($V_D < V_0''$).

Accordingly, in the circuit arrangement of this modified embodiment, the applied voltages to the condensers 3" and 4" may be very small value and by using capacitors of two polarity, the device can be made more compact and light weight.

Effect of the Invention

As has been explained in the foregoing, according to the present invention, a direct current to direct current converter being able to operate to step-up and step-down the input voltage can be realized in a simple circuit arrangement like the conventional double step-down choppers.

Furthermore, according to the present invention, the potential of the load circuit against the negative terminal of the direct current source is not related to the on or off condition of the switching elements so that it does not show sudden stepwise variation and a device having a feature of generating less higher harmonic noises through its grounding capacitance. Also the operation of the two switching elements is the same as the conventional embodiments to switch alternately in mutually phase shift relationship so that the invention maintains the merit of the conventional devices.

In the embodiments of the present invention, the switching elements are shown as GTO just as an example. But it is apparent that the invention can use other types of switching elements like transistors, FET and others.

What is claimed is:

1. A step-up and step-down chopper device comprising a series arrangement connected between positive and negative terminals of a direct current source, the series arrangement having a first reactor, a first switching element, a second reactor and a second switching element, the chopper device further comprising a second series arrangement of a first diode, a first condenser and a second diode connected between positive and negative poles of the second reactor, the device further comprising a second condenser connected between a positive polarity terminal of the first switching element and a negative polarity terminal of the first condenser, a third condenser connected between a negative polarity terminal of the second switching element and a positive polarity terminal of the first condenser and a load is connected between the two terminals of the first condenser.

2. A step-up and step-down chopper device comprising a series arrangement connected between positive and negative terminals of a direct current source, the series arrangement having a first reactor, a first switching element, a second reactor and a second switching element, the chopper device further comprising a second series arrangement of a first diode, a first condenser and a second diode connected between positive and negative poles of the second reactor, the device further comprising a second condenser connected between a positive polarity terminal of the first switching element and a positive polarity terminal of the first condenser, a third condenser connected between a negative polarity terminal of the second switching element and a negative polarity terminal of the first condenser and a load is connected between the two terminals of the first condenser.

* * * * *

UNITED STATES PATENT AND TRADEMARK OFFICE
CERTIFICATE OF CORRECTION

PATENT NO. : 5,059,887

DATED : October 22, 1991

INVENTOR(S) : Katsuji Iida and Takahiro Kishimoto

It is certified that error appears in the above-identified patent and that said Letters Patent is hereby corrected as shown below:

Column 6, line 29, "[(di/dt) = (VD/L)]"

should be

--[(di/dt) = ($V_D$/L)]--.

Signed and Sealed this

Thirteenth Day of April, 1993

Attest:

STEPHEN G. KUNIN

*Attesting Officer*   Acting Commissioner of Patents and Trademarks